United States Patent [19]

Rohner et al.

[11] Patent Number: 4,872,652
[45] Date of Patent: Oct. 10, 1989

[54] TWO CHAMBER ENGINE MOUNT

[75] Inventors: Gerhard Rohner, Hemsbach; Werner Idigkeit, Weinheim; Klaus Kurr, Weinheim-Hohensachsen, all of Fed. Rep. of Germany

[73] Assignee: Firma Carl Freudenberg, Weinheim/Bergstr., Fed. Rep. of Germany

[21] Appl. No.: 257,140

[22] Filed: Oct. 12, 1988

Related U.S. Application Data

[63] Continuation of Ser. No. 49,587, May 12, 1987, abandoned.

[30] Foreign Application Priority Data

Jun. 11, 1986 [DE] Fed. Rep. of Germany ....... 3619685

[51] Int. Cl.[4] .......................... F16M 1/00; B60K 5/12; F16F 13/00; F16F 15/04
[52] U.S. Cl. ................................ 267/140.1; 248/562; 248/563
[58] Field of Search .............. 267/140.1, 140.2, 64.18, 267/127, 219; 188/317, 322.13, 322.15, 320; 248/562, 563; 280/707

[56] References Cited

U.S. PATENT DOCUMENTS

| 4,635,910 | 1/1987 | Ozawa et al. | 267/140.1 |
| 4,650,170 | 3/1987 | Fukushima | 267/140.1 |
| 4,660,812 | 4/1987 | Dan et al. | 267/140.1 |
| 4,679,778 | 7/1987 | Tabata et al. | 267/140.1 |
| 4,700,933 | 10/1987 | Chikamori et al. | 267/140.1 |
| 4,709,779 | 12/1987 | Takehara | 267/140.1 |

FOREIGN PATENT DOCUMENTS

| 3340153 | 8/1984 | Fed. Rep. of Germany . | |
| 3508823 | 9/1986 | Fed. Rep. of Germany | 188/299 |
| 59-117930 | 7/1984 | Japan | 267/140.1 |
| 0113832 | 6/1985 | Japan | 267/140.1 |
| 0055426 | 3/1986 | Japan | 267/219 |
| 8603813 | 7/1986 | World Int. Prop. O. | 267/140.1 |

Primary Examiner—Andres Kashnikow
Assistant Examiner—Mark T. Le
Attorney, Agent, or Firm—Kenyon and Kenyon

[57] ABSTRACT

A two-chamber engine mount has a working space and a compensation space which are filled with liquid and connected by a choke aperture having the shape of a canal. The inlet and outlet openings of the choke canal are rigidly related to the choke canal and define its beginning and end. At a distance from the inlet opening of the choke canal, at least one transverse passage opening is provided parallel to the outlet opening. The transverse passage can be shut off by a valve which can be actuated by a signal.

7 Claims, 4 Drawing Sheets

TWO CHAMBER ENGINE MOUNT

This application is a continuation of application Ser. No. 049,587 filed May 12, 1987.

FIELD OF THE INVENTION

This invention relates to a two-chamber engine mount wherein a working space and a compensation space are filled with a liquid and are connected by a choke canal. The choke canal has an inlet and an outlet aperture. An adjusting device is provided for changing the mutual distance between the inlet and the outlet aperture.

BACKGROUND OF THE INVENTION

A two-chamber engine mount of the above-mentioned type is generally disclosed in European published patent application No. 155,646. In this engine mount, the adjusting device of the choke canal can be actuated manually so that an adjustment to an optimum value is possible prior to the two-chamber engine mount being placed in operation for the first time. There is no provision for a change in the effective length of the choke canal during normal use of this two-chamber engine mount. The original adjustment can therefore only be made for a frequently occurring operating condition. Therefore, the operating behavior is not very satisfactory under other operating conditions.

OBJECTS OF THE INVENTION it is an object of the present invention to provide a two-chamber engine mount wherein the attainment of optimum properties is possible under all operating conditions which may occur in normal use. These and other objects of the present invention will become apparent from the following description and claims in conjunction with the drawings.

SUMMARY OF THE INVENTION

According to the present invention, there is provided a two-chamber hydraulically damped engine mount having a choke canal connecting the working space and the compensation space in fluid communication. The inlet and outlet openings of the choke canal are rigidly related to the choke canal and determine the start and the end of the choke canal. At a distance from both the inlet opening and outlet opening of the choke canal, at least one transverse passage opening is provided parallel to the outlet opening. The transverse passage can be selectively shut off or opened by a valve which can be operated by a signal.

In engine mounts of the type to which the present invention is directed, it is desirable to achieve as good as possible damping if low-frequency vibrations in the range of 3 to 25 Hz are introduced, and as good as possible insulation if high-frequency vibrations are introduced.

The damping of the low-frequency vibrations is based on the use of extinguishing effects which come about by the back-and-forth motion of the liquid column contained in the choke canal. The liquid column has a given mass corresponding to its volume which is braced elastically against the rubber-elastic boundary wall of the working space and/or the compensation space. Accordingly, its effectiveness is limited to a narrow frequency range.

The engine mount of the present invention is intended to enlarge, if required, the liquid column contained in the choke canal by shutting off at least one transverse passage located in the choke canal, whereby the cancellation effect is relocated to a lower frequency range. Accordingly, the damping effect which is obtained is likewise relocated and this allows the achievement of an optimum damping effect over a wider range. If both regions are placed closely side by side, the respectively obtained damping effects merge almost unnoticeably into each other, which is equivalent to obtaining a wide-band high-quality damping effect. This can be extended to a frequency range of any desired width by adding, as required, further damping-producing lengths to the choke canal. It is important to note that the damping effect obtained in this manner is not at the expense of the desired insulation if high frequencies of more than 30 Hz are introduced.

The cross sections of the choke canal adjoining the transverse passage or transverse passages of the choke canal can be made of different sizes on both sides. It has been found to be advantageous if the individual cross sections of the choke canal have a cross-sectional size reduced in steps with increasing enlargement of the effective length.

The valve used for shutting off the transverse passage is advantageously a valve that can be actuated electrically because of the high response speed and accuracy thus attained. This valve can be equipped with a drive of its own with a control element of its own, for instance, in the form of a separate valve plug. A corresponding design is available in cases where the choke canal has only a single transverse passage.

In cases where several transverse passages in the choke canal are arranged parallel to each other, it may be found more advantageous for economic reasons to relate these passages in their totality to a single control element in the form of a gate control valve which can be adjusted by a stepping motor and which can be brought, as required, over an increasing number of outlets of the transverse passages. An increase of the effective length of the choke canal to the extent required can also be readily obtained in this manner.

For the basic operation of the engine mount according to the invention, it does not matter whether the inlet opening discussed in European patent application No. 155,646 is related to the working space or the compensation space. It is only important that the transverse passage extends parallel to the outlet opening and that it is made sufficiently large in cross section to permit, in the open condition of the valve, a vibration-wise decoupling of the liquid column contained in the choke canal between the transverse passage and the outlet opening from the liquid column which vibrates back and forth between the inlet opening and the transverse passage. Such a design presents no difficulties to one skilled in the art. If the valve is closed, both liquid columns form an inertial mass closed in itself which is larger than that with the valve open. Consequently, it has a lower resonance frequency. The effectiveness of the damping is shifted accordingly. In the engine mount according to the present invention, the inertial mass and resonance frequency is controllable by actuating the valve by a signal. This permits the achievement of an optimum damping effect in several frequency ranges. These frequency ranges can be close together so that the damping effects merge into each other and are effective over a wide band. The insulation of high-frequency vibrations is not interfered with and can therefore take place using all pertinent known means.

The signal required for actuating the valve or valves can be taken from a freely programmable computing unit. One or more control variables representing the vibration behavior of the engine are entered into the computing unit. These control variables may be, for example, the engine speed, the acceleration, the braking and/or the prevailing activated gear shift. Other possibilities for control variables will become readily apparent to one skilled in the art.

Embodiments of the engine mount in accordance with the present invention will now be described in detail with reference to the drawings.

DETAILED DESCRIPTION

Figure 1:
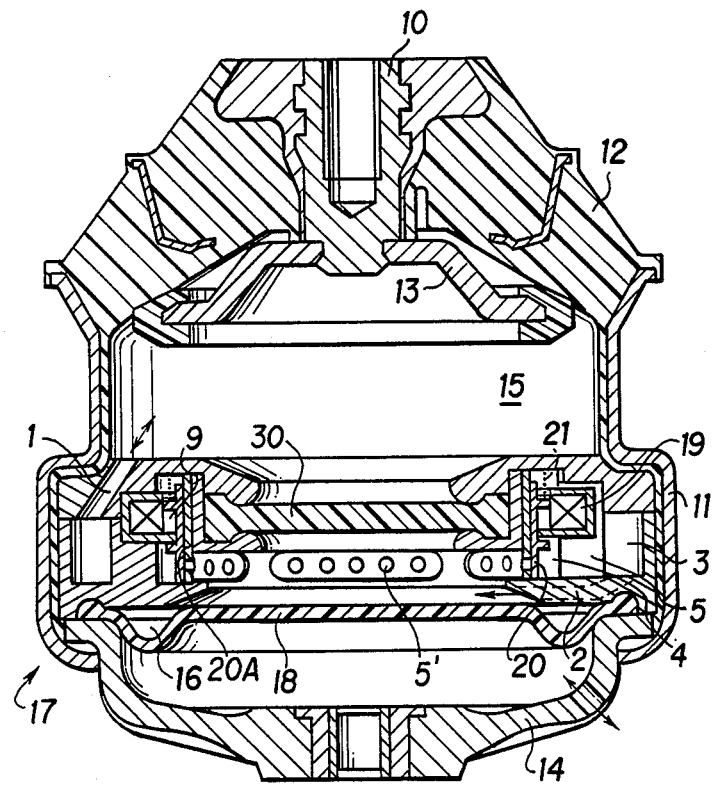
FIG. 1 illustrates a two-chamber engine mount, in accordance with one embodiment of the present invention, in a longitudinal sectional view.
Figure 2:
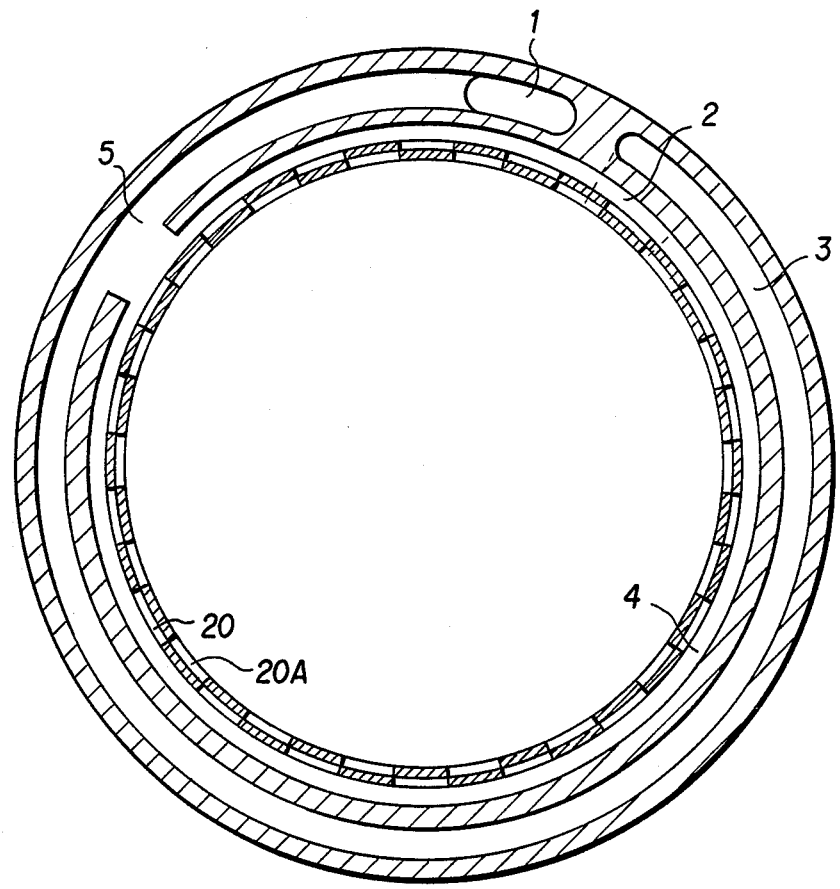
FIG. 2 illustrates in a top sectional view the region of the choke canal of the engine mount of FIG. 1.
Figure 3:
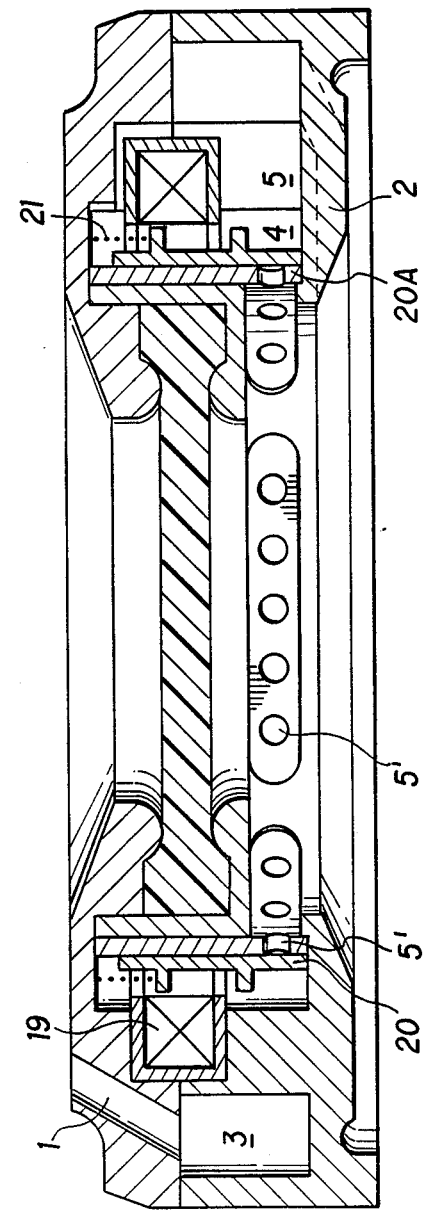
FIG. 3 illustrates the region of the choke canal of an engine mount of FIG. 1 in an enlarged view shown in longitudinal section.

The engine mount illustrated in FIG. 1 comprises a bearing 10 and a support bearing 11 which are connected by a support spring 12 suitably fabricated from an elastomer material such as rubber and having the shape of a hollow cone. The support bearing 11 encloses in its lower part a rigidly associated partition 17 which is arranged between a working space 15 and the compensation space 16 of the engine mount. The compensation space 16 is bounded on the underside by a cup membrane 18 which can give way in the direction of the bottom plate 14 with increased feeding of liquid volume displaced from the working space 15. The bottom plate 14 is likewise secured relatively immovably to the support bearing 11. Overall, the two-chamber engine mount has a rotation-symmetrical shape which makes it easy to place it in the engine compartment of a motor vehicle. The securing of the engine mount in the engine compartment is accomplished by a mutual screw connection of the bearing 10 to the engine and of the bottom plate 14 to the supporting body of the engine compartment.

An end stop 13, which is arranged in the interior of the working space 15, serves as protection against unduely large diverging motions of the bearing 10 relative to the support bearing 11. With the engine mount loaded, the end stop 13 has a spacing from the support spring 12.

The working space 15 and the compensation space 16 of the two-chamber engine mount illustrated in FIG. 1 are connected by a choke canal which is connected by the inlet opening 1 to the working space 15 and by the outlet opening 2 to the compensation space 16. The working space 15, the choke canal 3, and the compensation space 16 are completely filled with an incompressible liquid, generally a mixture of glycol and water.

The choke canal 3 is arranged in the illustrated embodiment of a two-chamber engine mount in the part of the partition 17 which is rigidly associated with the support bearing 11. In this embodiment, the choke canal 3 has a rectangular profile and encloses the inner part of the partition in circular fashion. A transverse passage 5 connecting canal 3 to inner annular chamber 4 is provided at a distance from both the inlet opening 1 and the outlet opening 2. Operation of the transverse passage 5 can be shut off by a valve, generally designated at 9, which can be actuated by a signal. In the opened condition of the valve, transverse passage 5 is directly connected to the compensation space 16 via annular chamber 4 and holes 5', as subsequently discussed. The amount of liquid entering the choke canal 3 via the inlet opening 1 therefore flows, if the valve is opened, through the choke canal 3 not over its entire length, but only over the length which is defined on the one hand by the inlet opening 1 and on the other hand by the transverse passage 5. The frequency of the vibration damped by extinguishing effect consequently corresponds to the frequency into which the liquid mass contained in the mentioned region can be set into a resonance vibration by the bulging elasticity of the support spring 12.

It will be apparent that the liquid column vibrating back and forth in the choke canal is increased if the signal-actuated valve is closed. This increase leads to a corresponding enlargement of the liquid mass vibrating back and forth and thereby, to a lowering of the resonance frequency thereof. The effectiveness of the damping is shifted accordingly, and can therefore be easily controlled by actuating the valve.

The valve 9, which can be actuated by a signal, is, in the embodiment according to FIG. 1, a slide valve, in which the cylindrical control slide 20, suitably fabricated from a soft steel, is arranged radially within a magnet coil 19. If the magnet coil 19 is not excited, the control slide 20 is displaced axially by the force of the compression spring 21 in relation to the same and causes the closing of the opening of the holes 5' distributed over the circumference of annular member 20A. The liquid entering into the choke canal 3 via the inlet opening 1 due to the spring action to the top bearing 10 can therefore leave the choke canal 3 only at its end via the outlet opening 2 in the direction of the compensation space 16. The liquid takes the same path in the reverse direction if the bearing 10 is sprung out. The total mass of liquid contained in the choke canal 3 accordingly determines, in connection with the bulging elasticity of the support spring 12, the frequency location of the damped vibration.

Excitation of the magnet coil 19 causes an axial shift of the control slide 20 against the force of the compression spring 21, whereby the holes 5' are opened in the direction of the compensation space. The amount of liquid entering the choke canal 3 via the inlet opening due to spring action of the top bearing 10 is thereby no longer forced to flow through the choke canal over its entire length. The liquid leaves the choke canal 3 after a short time via the transverse passage 5, where only a direction reversal results when the thrust bearing 10 springs out. The damping effects based on extinguishing effects is therefore effective in a correspondingly higher frequency range.

The partition 17 of the embodiment of the engine mount according to FIG. 1, encloses in its center part a circular flexible membrane 30 which is held in the vicinity of its outside circumference. This membrane can compensate by its resiliency high frequency vibrations above 30 Hz excited by the engine and in this manner prevents the occurrence of pressure changes in the working space 15 which are caused by corresponding vibrations. Therefore, corresponding vibrations cannot be detected in the wall bearing 11 and are isolated in an excellent manner.

Figure 4:
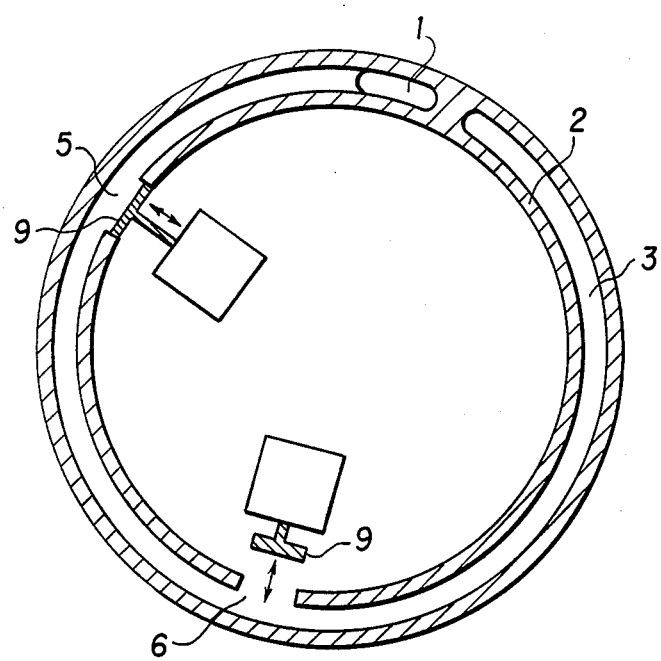
FIGS. 4 and 5 illustrate other embodiments and possible relationships of valves to a choke canal which is provided with several transverse passages all in accordance with the present invention.
Figure 5:
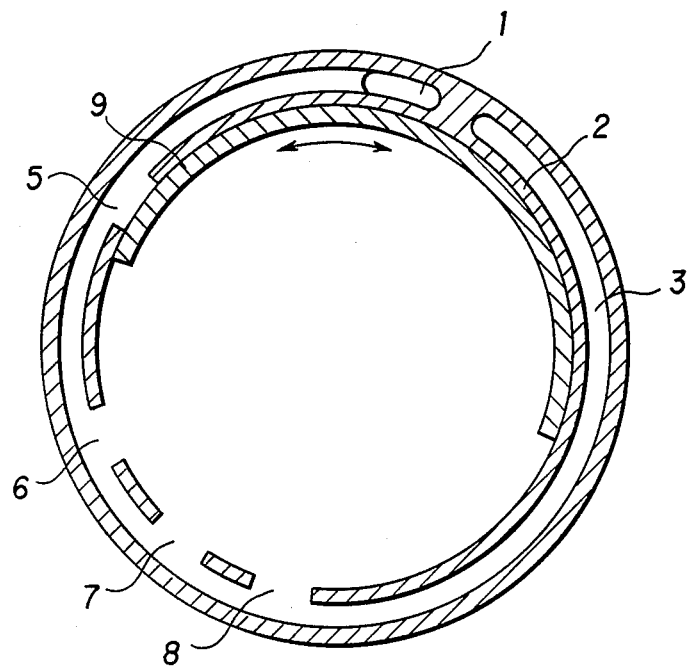

FIGS. 4 and 5 illustrate two different embodiments of the choke openings, transverse passages, and valves. In the embodiment of FIG. 4, two transverse passages 5, 6 are arranged between the inlet opening 1 and outlet opening 2 of the choke canal 3 and in the embodiment of FIG. 5, four transverse passages, 5, 6, 7, 8 are provided in the choke canal 3.

With reference to the embodiment of FIG. 4, two electromagnetically operated plug valves 9 are associated with the transverse passages 5, 6 which can be actuated independently of each other, and each has a drive of its own.

In the embodiment according to FIG. 5, the openings of all transverse passages 5, 6, 7, 8 are associated with a central control slide 9 which is driven by a stepping motor (not illustrated). The slide 9 can be slid by a relative rotation over an increasing number of openings, which leads to a blockage of the corresponding transverse passages. In this case, an increase of the number of transverse passages requires only the additional placement of a further hole. An extremely fine adjustment of the damping effectiveness to different frequencies can therefore be easily achieved.

Although preferred embodiments of the present invention have been described in detail, it is contemplated that modifications may be made by one skilled in the art all within the spirit and scope of the present invention as defined in the claims.

What is claimed is:

1. A two-chamber engine mount comprising:
   (a) means defining a working space;
   (b) means defining a compensation space;
   (c) a liquid filling said working space and said compensation space;
   (d) a choke canal having an inlet at one end communicating with the working space and an outlet at another end communicating with said compensation space;
   (e) said choke canal having at least one transverse passage disposed between said inlet and said outlet and being parallel to said outlet;
   (f) a valve means for selectively opening and closing said at least one transverse passage said at least one transverse passage to permit fluid communication between said compensation space and said choke canal in response to a signal whereby the amount of liquid resonating in the choke canal when the engine mount is subject to vibration is dependent upon selective operation of the valve means; and
   wherein said choke canal is annular and further including an inner annular chamber communicating with said at least one transverse passage, said valve means comprising an annular member having a plurality of openings communicating with said compensation space, and a cylindrical member slidably disposed with respect to said annular member to selectively cover and uncover said openings to selectively permit fluid communication between said at least one transverse passage and said compensation space.

2. Apparatus according to claim 1 wherein said means defining said working space and said means defining said compensation space include a flexible membrane disposed between said working space and said compensation space, said flexible membrane preventing the transmission of high frequency vibrations.

3. Apparatus according to claim 2 wherein the high frequency vibrations are above 30 Hz.

4. A two-chamber engine mount comprising:
   (a) means defining a working space;
   (b) means defining a compensation space;
   (c) a liquid filling said working space and said compensation space;
   (d) a choke canal having an inlet at one end communicating with the working space and an outlet at another end communicating with said compensation space;
   (e) said choke canal having a plurality of transverse passages that are disposed between said inlet and said outlet and each being parallel to said outlet; and
   (f) a plurality of separately operable valves, each of said plurality of passages being selectively coupled to said compensation chamber by one of said separately operable valves, each valve selectively opening and closing to permit fluid communication between said compensation space and a respective transverse passage in response to a signal whereby the amount of liquid resonating in the choke canal when the engine mount is subject to vibration is dependent upon selective operation of said separately operable valves.

5. A two-chamber engine mount as recited in claim 4 wherein said choke canal has a cross-sectional area between adjacent transverse passages narrowed in steps proceeding toward said outlet opening of said choke canal.

6. A two-chamber engine mount comprising:
   (a) means defining a working space;
   (b) means defining a compensation space;
   (c) a liquid filling said working space and said compensation space;
   (d) a choke canal having an inlet at one end communicating with the working space and an outlet at another end communicating with said compensation space;
   (e) said choke canal having a plurality of transverse passages that are disposed between said inlet and said outlet and each being parallel to said outlet; and
   (f) valve means for selectively opening and closing said transverse passages to permit fluid communication between said compensation space and at least one transverse passage in response to a signal whereby the amount of liquid resonating in the choke canal when the engine mount is subject to vibration is dependent upon selective operation of the valve means, wherein said valve means comprises a single rotatable member to bring selected ones of said transverse passages into communication with said compensation chamber.

7. A two-chamber engine mount as recited in claim 6 wherein said choke canal has a cross-sectional area between adjacent transverse passages narrowed in steps proceeding toward said outlet opening of said choke canal.

* * * * *